US009389967B2

(12) United States Patent
Dent

(10) Patent No.: US 9,389,967 B2
(45) Date of Patent: Jul. 12, 2016

(54) METHOD AND APPARATUS FOR IMPROVING ACCESS TO AN ATM DURING A DISASTER

(75) Inventor: Nathan Dent, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 732 days.

(21) Appl. No.: 13/161,609

(22) Filed: Jun. 16, 2011

(65) Prior Publication Data

US 2012/0324278 A1  Dec. 20, 2012

(51) Int. Cl.
G06F 11/00 (2006.01)
G06F 11/20 (2006.01)
G07F 19/00 (2006.01)
G09G 5/00 (2006.01)

(52) U.S. Cl.
CPC .............. *G06F 11/20* (2013.01); *G07F 19/20* (2013.01); *G09G 5/00* (2013.01); *G09G 2310/0221* (2013.01); *G09G 2330/08* (2013.01)

(58) Field of Classification Search
CPC .................... G06Q 20/108; G06Q 20/1085
USPC .............. 714/25; 702/182, 183; 379/106.01, 379/106.02, 106.03
See application file for complete search history.

(56) References Cited

U.S. PATENT DOCUMENTS

| | | | | |
|---|---|---|---|---|
| 4,628,192 A * | 12/1986 | Suzuki | ........................... | 235/1 R |
| 4,675,538 A * | 6/1987 | Epstein | ........................... | 307/64 |
| 4,818,854 A * | 4/1989 | Davies et al. | ................. | 235/381 |
| 4,922,184 A * | 5/1990 | Rosenstein et al. | .......... | 324/72.5 |
| 5,091,713 A * | 2/1992 | Horne et al. | .................. | 340/541 |
| 5,416,416 A * | 5/1995 | Bisher | .......................... | 324/426 |
| 5,416,725 A * | 5/1995 | Pacheco et al. | ............... | 702/176 |
| 5,500,940 A * | 3/1996 | Skeie | ............................... | 714/25 |
| 5,528,149 A * | 6/1996 | Chen | ............................ | 324/433 |
| 5,576,941 A * | 11/1996 | Nguyen et al. | ............. | 363/21.07 |
| 5,620,079 A * | 4/1997 | Molbak | .................... | G07D 1/04 194/217 |
| 5,726,573 A * | 3/1998 | Chen et al. | ..................... | 324/429 |
| 5,834,856 A * | 11/1998 | Tavallaei et al. | ................ | 307/64 |
| 5,982,652 A * | 11/1999 | Simonelli et al. | ............. | 363/142 |
| 6,057,646 A | 5/2000 | Pieroth et al. | | |
| 6,484,863 B1 * | 11/2002 | Molbak | .................... | G07D 1/04 194/216 |
| 6,494,776 B1 * | 12/2002 | Molbak | .................... | G07D 1/04 453/32 |
| 6,752,254 B1 * | 6/2004 | Allen | ........................ | G07F 9/00 194/346 |
| 7,284,694 B2 * | 10/2007 | Ferraro | ......................... | 235/379 |
| 7,419,093 B1 * | 9/2008 | Blackson et al. | ............. | 235/379 |
| 7,595,738 B2 | 9/2009 | Krock et al. | | |
| 7,866,544 B1 | 1/2011 | Block et al. | | |
| 7,959,072 B1 | 6/2011 | Jenkins et al. | | |
| 8,423,465 B1 * | 4/2013 | McGraw et al. | ................ | 705/43 |

(Continued)

FOREIGN PATENT DOCUMENTS

WO    WO 0167365    9/2001

*Primary Examiner* — Bryce Bonzo
*Assistant Examiner* — Jeison C Arcos
(74) *Attorney, Agent, or Firm* — Weiss & Arons LLP; Michael A. Springs, Esq.

(57) ABSTRACT

A method and apparatus that allow a user to easily operate a self-service device despite the presence of damage is provided. Anticipated damage includes extreme environmental conditions such as earthquakes, flooding, strong winds, tsunamis, etc. These conditions may cause a failure in a portion of the self-service device. Improved ruggedness and redundant components are coordinated by suitable software to provide service despite damage to the self-service device. Additionally, access to some user accounts despite the loss of connectivity to a server maintaining user accounts is provided.

9 Claims, 5 Drawing Sheets

(56) References Cited

U.S. PATENT DOCUMENTS

| | | | |
|---|---|---|---|
| 8,589,731 B1* | 11/2013 | Munson et al. | 714/19 |
| 2002/0183971 A1* | 12/2002 | Wegerich et al. | 702/185 |
| 2005/0121508 A1* | 6/2005 | Fumanelli | 235/379 |
| 2005/0162019 A1* | 7/2005 | Masciarelli et al. | 307/66 |
| 2007/0162389 A1* | 7/2007 | Hamilton et al. | 705/43 |
| 2008/0091601 A1 | 4/2008 | Green et al. | |
| 2008/0157601 A1* | 7/2008 | Masciarelli et al. | 307/66 |
| 2009/0187842 A1 | 7/2009 | Collins et al. | |
| 2009/0250536 A1* | 10/2009 | Henderson | 241/100 |
| 2010/0059587 A1 | 3/2010 | Miller et al. | |
| 2011/0125615 A1 | 5/2011 | Shirbabadi et al. | |

* cited by examiner

METHOD AND APPARATUS FOR IMPROVING ACCESS TO AN ATM DURING A DISASTER

FIELD OF TECHNOLOGY

Aspects of the disclosure relate to providing apparatus and methods for improving access to a self-service devices such as Automatic Teller Machines ("ATMs"), cash recyclers, and self-service kiosks.

BACKGROUND

Self-service devices such as Automatic Teller Machines ("ATMs"), cash recyclers, and self-service kiosks are often operated in an exposed environment.

A self-service device operating in an exposed environment may be subject to extreme environmental conditions such as earthquakes, flooding, strong winds, tsunamis etc. These conditions may cause a failure in a portion of the self-service device and render the device unusable. Repairs to a self-service device in a geographic area subjected to extreme environmental conditions may take a great deal of time. When the device is unusable, customers in the affected areas may have little or no access to necessary funds or services.

It would be desirable, therefore, to provide apparatus and methods that allow a user to easily operate a self-service device despite the presence of damage caused by severe environmental conditions.

Another drawback associated with the aforementioned circumstances is the loss of connectivity between the self-service device and a central server which provides verification of the status of user accounts.

It would be desirable, therefore, to provide apparatus and methods that allow a user at least some access to his or her accounts despite the loss of connectivity to the central server.

SUMMARY OF THE DISCLOSURE

An electronic self-service device is provided. The self-service device includes a display screen and may include a keyboard or other input devices. The self-service device may include weatherproof input and output devices and weatherproof mechanical transfer devices—e.g., cash dispensers and/or printers. The term weatherproof may include weather resistance. The self-service device may also include redundant input devices, output devices, mechanical transfer devices and support devices—e.g., redundant power supplies and/or redundant central processing units. The self service device may be anchored to prevent movement during changes in environmental conditions—e.g., strong winds or earthquakes.

The self service device may be configured to warn users about the presence of oncoming weather conditions and/or important local events—e.g., a scheduled parade. The self-service device may also be configured to operate in the absence of communication to the servers which maintain user accounts.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
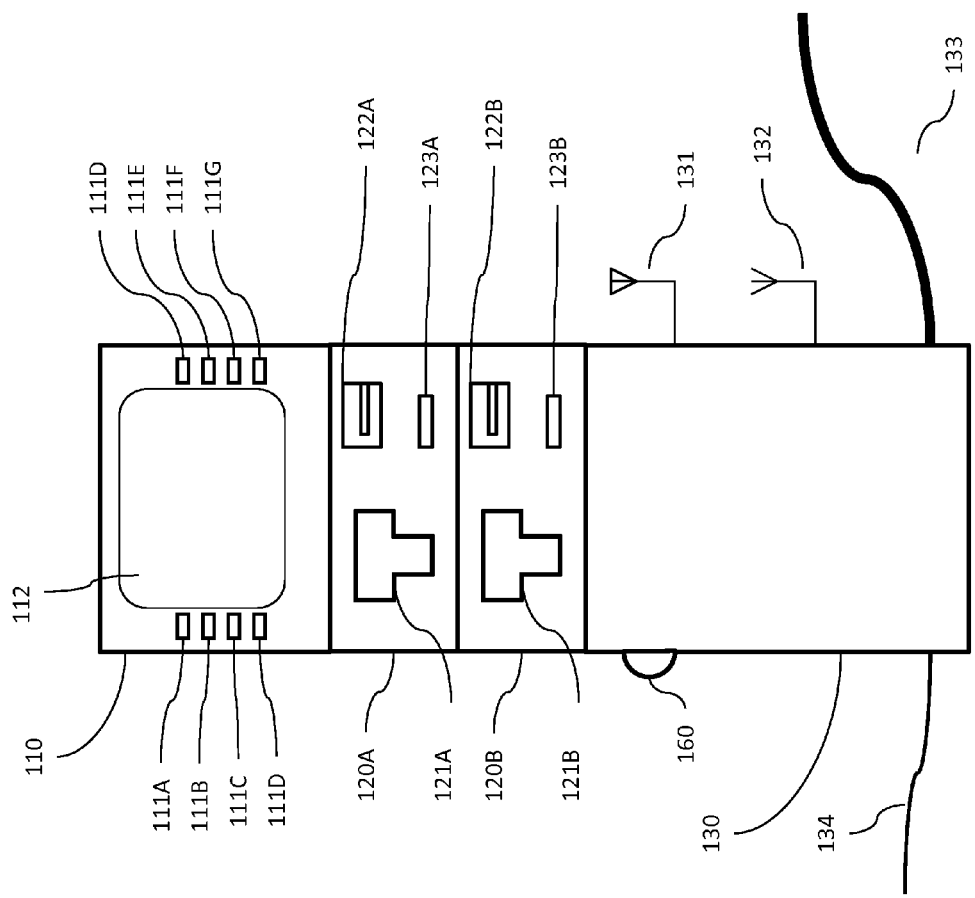
FIG. 1 shows a schematic diagram of the front view of a self-service device.

Apparatus and methods for improving the availability of self-service devices such as Automatic Teller Machines ("ATMs"), cash recyclers, and self-service kiosks which have been subject to severe environmental conditions are provided. Improving availability may include weatherproof and/or redundant mechanical and electronic components. Software supporting the redundant components and adding addition functionality according to the invention is also included. Improving availability may include providing some service to select customers despite the absence of connectivity between the self-service device and a central server which maintains user accounts.

A self-service device, which may be an ATM, for use with apparatus and methods according to the invention may include one or more of the following devices or other suitable devices: a CPU (which may control user interface mechanisms, transaction devices, and communication with a central server maintaining user accounts), a magnetic card reader (to identify the card being used), a PIN pad, a cryptoprocessor, a display, function keys (usually in close proximity to the display) and/or a touchscreen, a printer (to provide a transaction record to a customer), a vault (to store portions of the machinery requiring restricted access), and a housing. In certain self-service devices, a smart card reader (that reads a chip instead of a magnetic strip) and bill validation technology may also be implemented. A further feature of a self-service device for use with systems and methods according to the invention may include printing each transaction to a roll paper journal that is stored inside the self-service device.

The apparatus and methods may be scalable, for example, to cover all or a portion of the fleet of ATMs that run on a platform, such as that available under the trademark APTRA platform, which is available from the NCR Corporation, Dayton, Ohio.

A self-service device, which may be an ATM, for use with apparatus and methods according to the invention may include a display screen for display to a user. The display screen may be limited to display only, or the display screen may also include a touch screen.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, flash devices and/or any combination thereof. In addition, various signals representing data or events as described herein may be transferred between a source and a destination in the form of electromagnetic waves traveling through signal-conducting media such as metal wires, optical fibers, and/or wireless transmission media—e.g., air and/or space.

For the purposes of this application, the term component refers to a portion of a self-service device.

FIG. 1 is a schematic diagram showing an embodiment of a self-service device 100 which may include an upper portion 110, a first middle portion 120A, a second middle portion 120B, and a lower portion 130.

The upper portion 110 may include multiple components, a display screen 112 and a set of buttons 111A-111G. Preferably the upper portion 110 is environmentally sealed to prevent damage to the display screen 112 and the buttons 111A-111G due to severe environmental conditions. The first middle portion 120A may include multiple components such as a cash dispenser 121A, a card reader 122A and a printer 123A. The second middle portion 120B may include multiple components such as a cash dispenser 121B, a card reader 122B and a printer 123B. Each of cash dispensers 121A, 121B, a card readers 122A, 122B and printers 123A, 123B may be weatherproof—i.e., angled or shielded so that liquids does not readily enter the device and/or contain flaps or sumps that prevent liquids, mud etc. from clogging or damaging the components and/or self-service device 100.

Card readers 122A and 122B may be configured to read magnetic stripe cards, smartcards or any other suitable card. One or more of printers 123A, 123B may be configured to print on plastic film and/or paper with or without waterproof ink.

Although two middle portions 120A and 120B are shown, other configurations including one or more than two middle portions are contemplated and are included within the scope of the invention. Likewise a single middle portion which includes multiple implementations of cash dispenser 121A, and/or a card reader 122A and/or a printer 123A is also contemplated and is included within the scope of the invention.

Lower portion 130 may be connected to a network via one or more components such as a cable connection 133, a land line connection 134, a cellular connection 132, a WiFi connection 131 and a GPS connection 160. Other suitable connections—e.g., satellite modems, Bluetooth®, near field connectivity—are also contemplated and are included within the scope of the invention.

Figure 2:
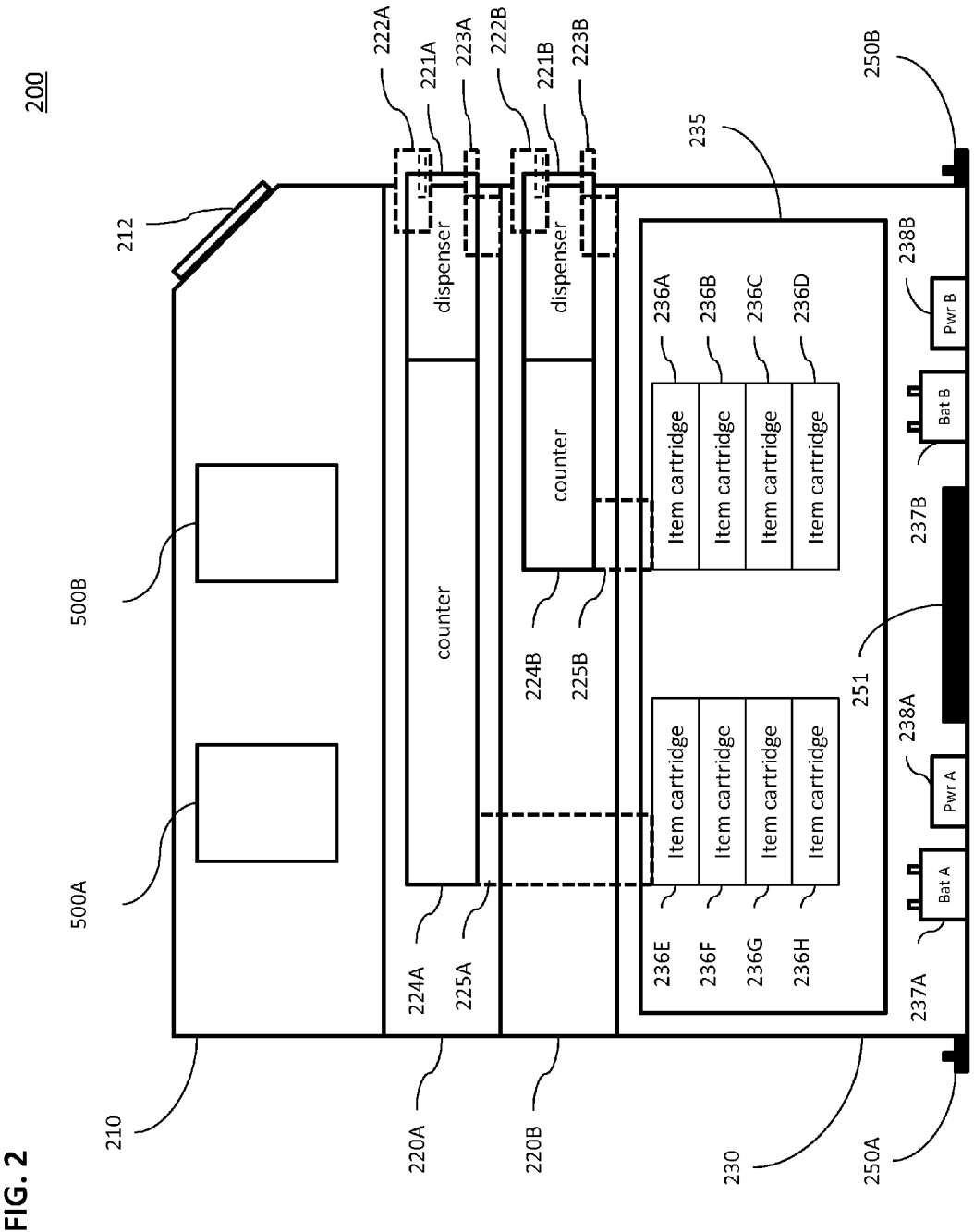
FIG. 2 shows a schematic of a portion of the internal components of a self-service device.

FIG. 2 shows a side view of an embodiment of a self-service device 200. Self-service device may have some or all of the features of self-service device 100. Self-service device 200 may include an upper portion 210, a first middle portion 220A, a second middle portion 220B, and a lower portion 230. The upper portion 210 may include a display screen 212 and redundant circuit board 500A and 500B which may operate software and/or hardware to operate self-service device 200.

Circuit boards 500A and 500B may be wholly redundant—i.e., each circuit board may be capable of operating the entire self-service device 200 or the circuit boards may share the workload. In a sharing configuration performance may be improved when both circuit boards 500A and 500B are operational but reduced functionality and/or speed may be available if either 500A or 500B fails or is damaged.

Although two circuit boards 500A and 500B are shown, other configurations including one or more than two circuit boards are contemplated and are included within the scope of the invention. Minimal redundancy is provided for a configuration containing a single circuit board. Increased availability of self-service device 200 functionality may be provided if more than two circuit boards are included.

The first middle portion 220A may include multiple components such as a cash dispenser 221A, a card reader 222A and a printer 223A. Cash dispenser 221A may receive items from item counter 224A. The second middle portion 220B may include multiple components such as a cash dispenser 221B, a card reader 222B and a printer 223B. Cash dispenser 221B may receive items from item counter 224B.

Each of cash dispensers 221A, 221B, a card readers 222A, 222B and printers 223A, 223B may be weatherproof—i.e., angled or shielded so that liquids does not readily enter the components and/or contain flaps or sumps that prevent liquids, mud etc. from clogging or damaging the components or the self-service device 200.

Card readers 222A and 222B may be configured to read magnetic stripe cards, smartcards or any other suitable card. One or more of printers 223A, 223B may be configured to print on plastic film with waterproof ink.

Lower portion 230 may include components of a portion of the mechanical systems which provide the functionality of self-service device 200. Item cartridges 236E-236H may provide items to counter 224A via chute 225A. Item cartridges 236A-236D may provide items to counter 224B via chute 225B. Item cartridges 236A-236H may be contained in vault 235. Vault 235 may surround some or all of the components of self-service device 200.

In the event that the self-service device sustains severe environmental damage, and/or the area in which the self-service device is located becomes dangerous—e.g., in the event of a nuclear accident such as the 2011 tsunami in Japan—it may be advantageous to be able to mark and/or destroy the cash in the machine so as to limit the possibility of, and danger coincident with, looting. Accordingly, in certain embodiments of the invention, vault 235 may preferably include cash-marking mechanisms (not shown), and/or cash-destroying mechanisms (not shown). In such instances, the cash-marking mechanisms and/or the cash-destroying mechanisms may mark or destroy the cash, as necessary to prevent looting of machines in stricken areas.

Cash-marking mechanisms may include, but are not limited to, mechanisms that die the cash in the machine with indelible ink. In alternative embodiments, cash-marking mechanisms may include mechanisms that place a traceable, but invisible, ink or other material, on the cash in the machine.

Cash-destroying mechanisms may include incendiary mechanism(s) that burn the cash in the vault. Cash-destroying mechanisms may also include explosive device(s) that may be used to destroy the cash in the vault. In yet other embodiments of the invention, cash-destroying mechanisms may include cash-shredding mechanisms. In such embodiments, the destruction of the cash may count towards the amount of the funds that the financial institution associated with the self-service device may be permitted, in a preferably pre-determined period, to destroy and/or transfer to the authorities for destruction.

The implementation of a cash-marking mechanism and/or cash-shredder according to the invention may be as follows. Assuming that the cash-dispensers continue to operate then a cash-marking sequence may involve feeding cash through the dispenser while engaging an indelible ink writer proximal to the dispenser. Alternatively, a cash-destroy sequence may involve feeding cash through the dispenser while engaging a plurality of blades proximal to the dispenser such that any cash being fed through the dispenser gets shredded by the plurality of blades.

Cash-marking mechanisms and/or cash-destroying mechanisms may be activated using internal damage detection triggers. Responsive to the detection by the triggers of certain environmental conditions—e.g., high radiation conditions—the cash-marking and/or cash-destroying sequence may be invoked. Implementation, and public dissemination of the knowledge, of such sequences may preferably discourage dangerous looting patterns.

Figure 5:
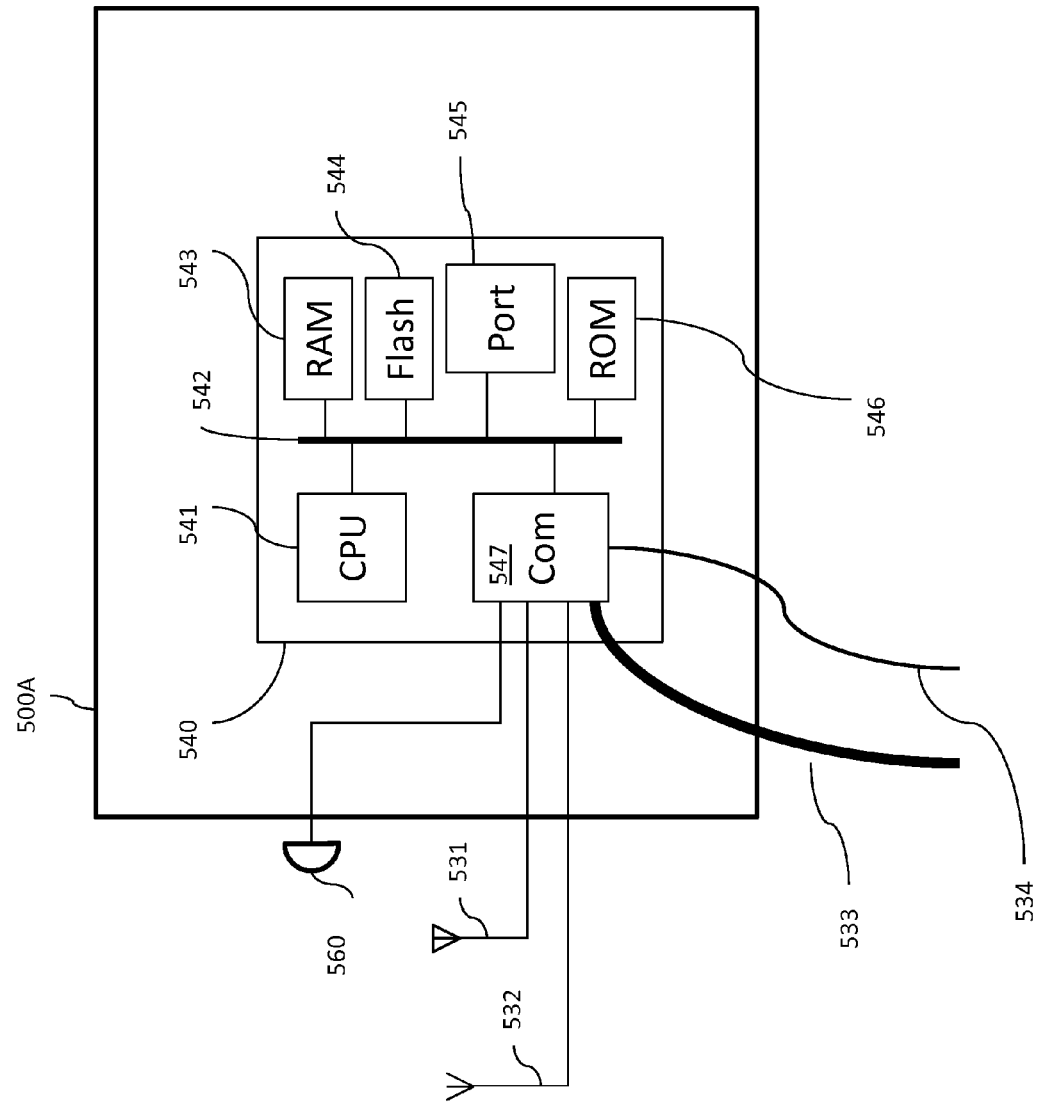
FIG. 5 is a schematic diagram of an exemplary circuit board for use with a self-service device according to the invention.

In other embodiments, cash-marking mechanisms, and/or cash-destroying mechanisms may be activated by a remote signal. Responsive to the receipt of a remote signal from one of land line connection 534, cellular connection 532, WiFi connection 531 and GPS connection 560 (as shown in FIG. 5), cash-marking mechanism and/or cash-destroying mechanism may be activated.

Item handling mechanisms may include conveyors (not shown) for positioning and repositioning items for dispensing by dispensers 221A, 221B. Items (not shown) in item handling mechanism may be contained in item cartridges 236A-236H.

Item cartridges may dispense paper currency, coinage, printer cartridges, drugs, DVDs or any other suitable item.

Although item cartridges 236A-236H are shown as two equal stacks, other configurations including one stack or more than two stacks and unequal stacks are contemplated and are included within the scope of the invention. Support structures for multiple stacks—i.e., chutes, counters etc.—are also contemplated and included within the scope of the invention.

Lower portion 230 may also include power supplies 238A and 238B which supply power to some or all of the components of self-service device 200. The power supplies 238A and 238B may have battery backup systems 237A and 237B respectively. The battery backup systems 237A and 237B may be configured to combine their resources to support either power supply 238A or 238B as needed. The power supplies 238A and 238B may be configured to combine their resources or to support different portions of the self-service device 200 as needed.

Although two power supplies 238A and 238B and two battery backup systems 237A and 237B are shown, other configurations including one or more than two power supplies and/or battery backup systems are contemplated and are included within the scope of the invention.

Lower portion 230 may further include one or more stabilization weights 251. Battery backup system 237A and 237B may be positioned within self-service device 230 to augment the stabilization weight 251. Anchors 250A and 250B may fasten self-service device 200 to any other local structure to prevent movement of self-service device 200 even under severe changes in the surrounding environment. Anchors 250A and 250B may be configured to resist theft and/or vandalism.

Although two anchors 250A and 250B are shown, other configurations including one or more than two anchors 250A and 250B are contemplated and are included within the scope of the invention. Furthermore any suitable position for the anchors 250A and 250B relative to the self-service device 200 and the local environment—i.e., structures and/or foundation—is contemplated and included within the scope of the invention.

Both self-service device 100 and self-service device 200 include redundant components—e.g., printers, card readers, etc. Each self-service device may be configured mechanically, electrically and via software to provide maximum availability in the event that a component or components fail.

Example 1

If printer 223A runs out of paper, printer 223B provides a printout for self-service device 200.

Example 2

If card reader 122B is damaged by rain, card reader 122A permits access to the self service device 100.

A user and/or the software, which may be running on circuit board 500A and/or 500B, may determine which components are operational. The operational components may be used to provide services to users. If all components are operational, then the software and/or the user may choose to use any component according to convenience or to equalize wear and tear on the devices.

Redundancy also extends to the mechanical operation of self service device 200. Selection of a dispenser 222A may be determined according to available items in the stack of item cartridges 236A-236D or according to damage sustained by chute 225B and counter 224B.

A cross feeding mechanism (not shown) may allow an item from item cartridges 236A-236D to be accessed via chute 225A and items from cartridges 236E-236H via chute 225B.

Each item cartridge and/or printer may have extra capacity to provide service during emergencies. Shielding and seals may be provided that prevent damage to the self-service device or its contents during a radiological event such as a nuclear accident.

Likewise redundancy may also extend to the various communication methods available—e.g., cable, satellite, WiFi etc. Should one method of communication fail, software may automatically attempt to re-establish communication between the self-service device and the server via alternate methods. Once every method has been tried and has failed, the software may periodically attempt to re-establish communication. Should power be supplied solely by batteries, the software may make a judicious tradeoff between establishing communication and operating the self-service device.

Figure 3:
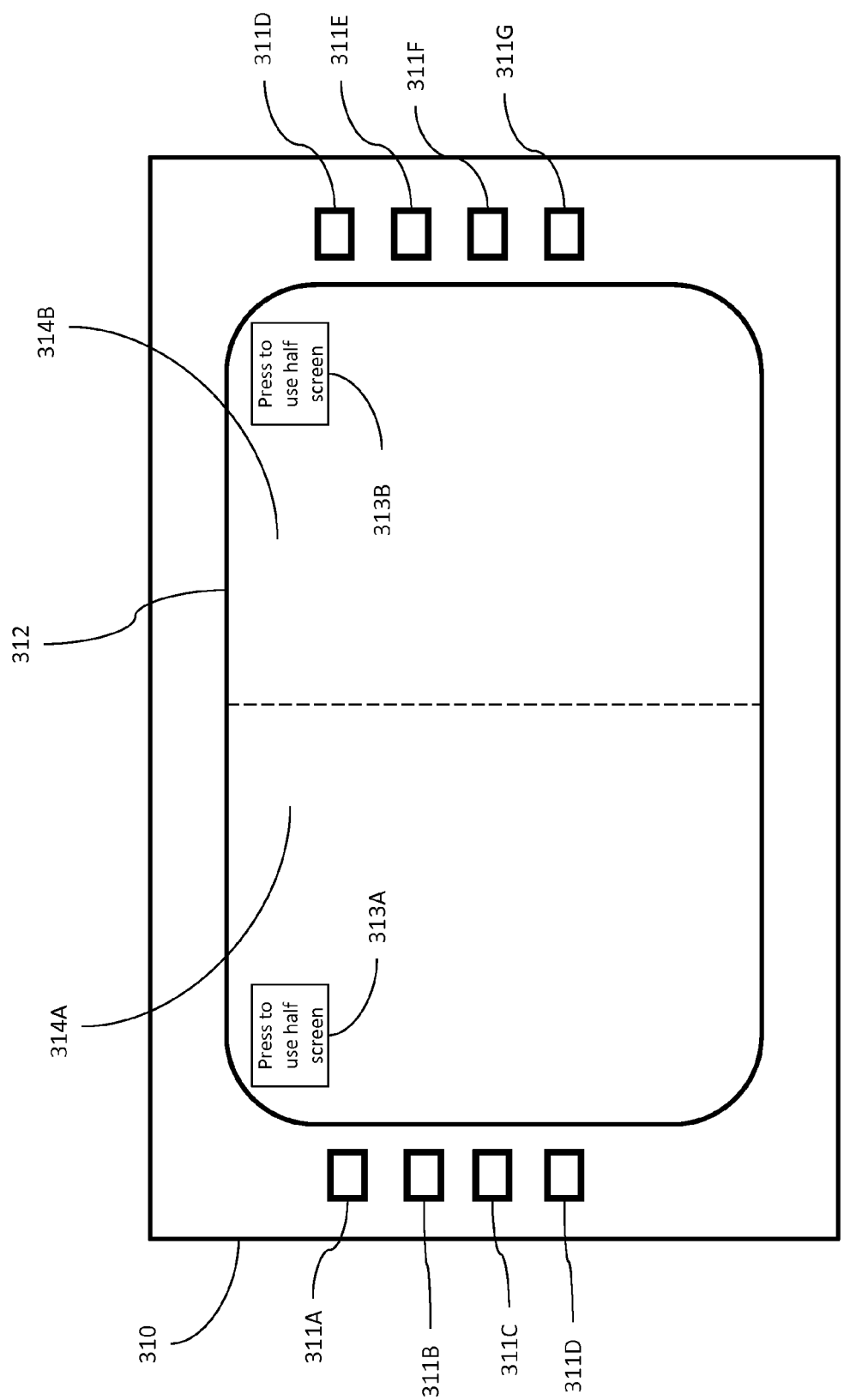
FIG. 3 shows a schematic of a display screen used by the self-service device.

FIG. 3 shows a view of an embodiment of an upper portion of a self-service device 310. Upper portion 310 may be used for self-service device 100 and/or self-service device 200. Upper portion 310 may include a display screen 312 with a viewable area 314A and 314B. Display screen 312 may be a touch screen. Preferably the upper portion 310 is sealed to prevent damage to the display screen 312 in the event of severe environmental conditions.

Upper portion 310 may include buttons 311A-311G. The touch screen functionality of screen 312 may replace and/or augment buttons 311A-311G.

Preferably, each viewable area 314A and 314B includes a button 313A and 313B respectively. The button may be a touch screen area or "soft" button. Alternately, one or more of the buttons 311A-311G may serve as buttons 313A and 313B. Each button may contain a prompt for the user. The user may elect to use either half screen 314A or half screen 314B by pressing the button 313A, 313B respectively. The pressing of the button configures the self-service device 100, 200 to use only that half screen for the user interface. Presumably this functionality is engaged if either half screen 314A or half screen 314B sustained damaged.

Preferably, the display screen 312 should be constructed so that the loss of a single driver chip affects only one half screen—i.e., row drivers drive only one half of the screen row. Preferably row and column drivers are placed around the screen so that physical damage to the screen 312 would leave at least one half screen 314A, 314B operational. Although half screens 314A, 314B are shown, other configurations including one or more than two portions of screen 312 are contemplated and are included within the scope of the invention.

Preferably, display screen 312 may display buttons 314A and 314B when the self-service device determines that it has been damaged. Alternately, the buttons 314A and 314B may be displayed as a default. Buttons (not shown) may be presented to allow the user to select a full screen display. Alternately, by ignoring buttons 314A and 314B, the user effectively selects the full screen display. In yet an another alternative, the self-service device 100, 200 may determine the extent of damage to the display 312 and present information exclusively on the undamaged portion of display 312.

Display screen 112, 212 and 312 may be used for more than the operation of the self-service devices 100 and 200. Preferably the display screen will also provide information to users or passerbies. Such information may include items of interest such as an amber alert—i.e. an alert that a child is missing—or any other suitable information. Other displayed information may include warnings about events that may inconvenience future use of the self-service device—e.g., severe weather requiring a local evacuation or a local event such as a parade that may prevent access to the device.

Displayed warnings may include notification of upcoming events such as hurricanes, or information concerning an ongoing event such as the aftereffects of an earthquake. GPS coordinates of the particular self-service device may be used to show the relative positions of various difficulties and that device. Evacuation routes from the self-service device or from any other location to a safe location may be also be displayed.

The self-service device may also broadcast its GPS coordinates over any available communication medium to aid in local rescue attempts or to call for repairs to the device.

Figure 4:
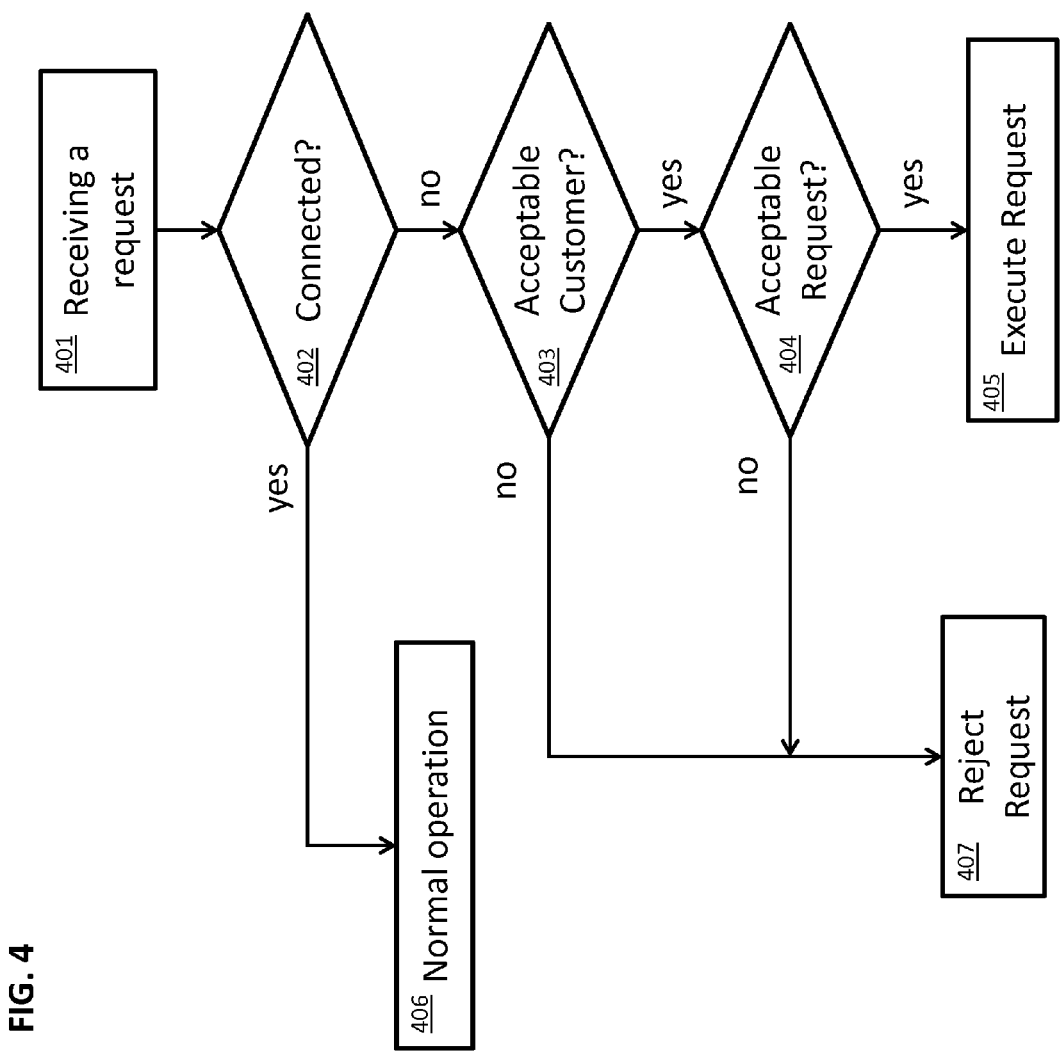
FIG. 4 shows a flow diagram governing the behavior of the self-service device in the absence of communication to a central server.

FIG. 4 shows a flow chart for implementing an algorithm 400 which may provide service even when the self-service device 100, 200 is disconnected from the server which maintains user accounts. If the self-service device—e.g., an Automatic Teller Machine—cannot connect to the server containing user accounts it may not be permitted to provide currency to users. However, under severe environmental conditions it may be useful to provide some level of service to important or trusted customers.

The server may maintain user accounts, give permission to dispense drugs or provide other coordination services between a network of self-service devices. Any connection to a coordinating server or group of servers is contemplated and included within the scope of the invention.

At step 401 the self-service device 100, 200 accepts a request from a potential user. At step 402 the self-service device verifies connectivity to a suitable server. If the self-service device is connected via a network to a suitable service normal operation commences at step 406. If the self-service device is not connected to a server then the potential user is checked against a list of trusted customers. Preferably a database of trusted customers is maintained within the self-service device 100, 200. If the user is not deemed trusted, the request is rejected at step 407.

If the customer is deemed trusted, the request is examined at step 404. If the request is deemed unacceptable—e.g., a large sum of cash is requested from an ATM relative to recently known balances—the request is rejected at step 407. Otherwise the request is executed at step 405.

FIG. 5 shows an exemplary circuit board 500A which may form a portion of a self-service device according to the invention. Circuit board 500A may include CPU 541, bus 542, RAM 543, flash memory 544, port(s) 545 (for operation of apparatus such as a printer, display, keypad etc.), ROM 546 and communications sub-system 547. Communications sub-system 547 may include a modem, and may connect to cable connection 533, land line connection 534, cellular connection 532, WiFi connection 531 and GPS connection 560. It should be noted, in systems and methods according to the invention, port(s) 545 may be used for additional connectivity to sensors, cameras etc. or other devices.

In certain embodiments of the invention, buttons 111A-111G may be located on a separate console (not shown) that is mounted on the wall proximal to the self-service device. Such a wall-mounted console may preferably be easily-accessible even if the self-service device was currently located in a relatively less accessible position. Such an accommodation may permit access to the self-service device by a person in a wheelchair. The buttons may communicate with the self-service device via any suitable method—e.g., Bluetooth®. The button console may be mounted in a detachable fashion to permit easier access for disabled persons. Suitable security features may be incorporated into the console to prevent theft of the console.

In some embodiments of the invention, following use by a consumer, the self-service device may drop to a default height, wherein the relatively low default height is accessible by a wheelchair-bound self-service device user.

In certain embodiments of the invention (not shown), the self-service device may be movable in two or more tracks that are mounted in a building wall. Such an self-service device may be adjustable in a single degree of freedom; up and down with respect to the floor, or multiple degrees of freedom.

In other embodiments of the invention, the self-service device may be movable by use of a preferably internally-mounted scissor-jack. The scissor jack may be mounted in the floor of the self-service device housing, or in the portion of the floor bounded by the outer walls of the self-service device housing.

In certain embodiments, the vertical movement of the self-service device may be administered via the projections into the building. Further, such movement may be implemented by exerting force, from within the building, in a vertical direction on the projections.

Thus, apparatus that allow a user to easily operate a self-service device despite the presence of damage caused by severe environmental conditions and allow a user at least some access his or her accounts despite the loss of connectivity to the central server are provided.

Persons skilled in the art will appreciate that the present invention can be practiced by other than the described embodiments, which are presented for purposes of illustration rather than of limitation, and that the present invention is limited only by the claims that follow.

What is claimed is:

1. A self-service device connected to a server, said server comprising a memory, the self-service device comprising:

a first chute for physically coupling an item cartridge with an item counter;

a second chute for providing a redundant physical path for physically coupling the item cartridge with the item counter;

a first portion for maintaining the connection to the memory at the server;

a second portion for maintaining a local computer memory, wherein a database of trusted self-service users is maintained within the second portion of the self-service device; and a processor for:

determining whether a functionality of the first chute has been destroyed by physical damage and, in the event the functionality of the first chute has been destroyed by physical damage, replacing the functionality of the first chute with the second chute; and determining whether a functionality of the connection to the memory at the server has been destroyed by physical damage and, in the event the functionality of the connection to the memory at the server has been destroyed by physical damage:

checking a potential user of the self-service device against a list of trusted users to determine whether a potential user is stored as a trusted user; and when the potential user is determined to be a trusted user and a self-service transaction requested by the potential user is for an amount deemed by the self-service device to be an acceptable transaction, executing the transaction independent of a connection to the server.

2. The device of claim 1 further comprising at least one stabilization weight.

3. The device of claim 1 further comprising at least one anchor.

4. The device of claim 1 wherein the self-service device detects physical damage to the first portion of the self-service device and communicates the physical damage to a remote location.

5. The device of claim 1 wherein the self-service device receives an instruction from a remote location to replace the functionality of the first chute of the self-service device with the second chute of the self-service device.

6. The device of claim 1 further comprising cash-destroying apparatus.

7. The device of claim 6 wherein the cash-destroy ing apparatus includes a cash-shredding apparatus.

8. The device of claim 1 further comprising cash-marking apparatus.

9. The device of claim 8 wherein the cash-marking apparatus includes one of an indelible ink marking apparatus and an invisible material marking apparatus.

\* \* \* \* \*